F. M. DRUM.
EVERSET MOUSE TRAP.
APPLICATION FILED MAR. 15, 1915.
1,163,071.
Patented Dec. 7, 1915.
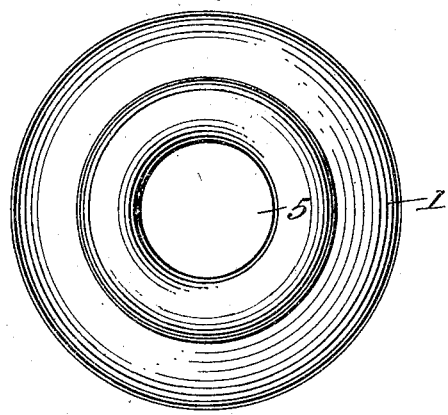
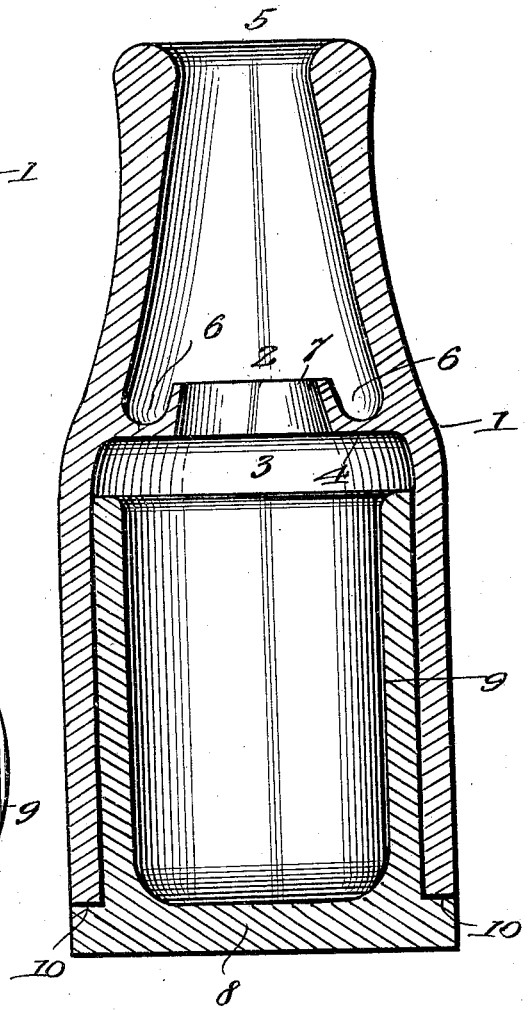
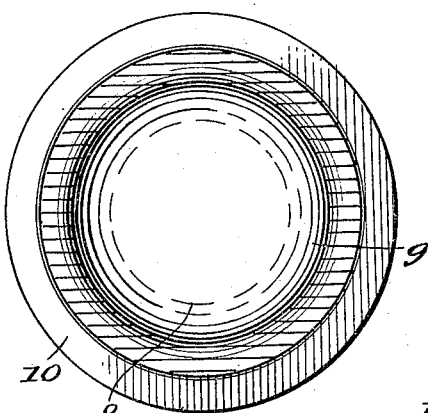
WITNESSES:
INVENTOR.
BY Francis M. Drum

UNITED STATES PATENT OFFICE.

FRANCIS M. DRUM, OF SAWTELLE, CALIFORNIA.

EVERSET MOUSE-TRAP.

1,163,071. Specification of Letters Patent. Patented Dec. 7, 1915.

Application filed March 15, 1915. Serial No. 15,677.

*To all whom it may concern:*

Be it known that I, FRANCIS M. DRUM, a citizen of the United States, residing at Sawtelle, county of Los Angeles, and State of California, have invented certain new and useful Improvements in Everset Mouse-Traps, of which the following is a specification.

This invention relates to ever-set mouse traps.

The object of the present invention is the provision of a simple, inexpensive and efficient ever-set mouse trap embodying improvements, whereby, once the mouse enters the trap and partakes of the bait, his escape is rendered impossible; and further, the capture, or, killing of the rodent is insured and his removal from the trap rendered quick and easy.

In carrying out my invention, I provide a receptacle having an entry, an internal bait holder of novel construction and arrangement, and a catching chamber. Preferably, the catching chamber has a removable cup-shaped telescoping part by which the captured rodents may be quickly and easily removed. The form of the chamber for the captive mouse may be varied and so may the closure therefor. Variations may be resorted to in the form of the bait holder. I do not, therefore, limit myself to the details of construction hereinafter set forth and shown in the drawings except where specified in the claims as the disclosure is illustrative, rather than restrictive, of the scope of the invention.

In the accompanying drawings:—Figure 1 is a vertical section showing the complete trap; Fig. 2, a plan view thereof; and Fig. 3, a plan view of the cup.

The trap body 1 is provided with an entry chamber 2 and a retaining or catching chamber 3 which are separated by the bait holder 4. The entry 5 to the chamber 2 is relatively small and is of only such size that it will be adapted for the convenient entry of the rodent. The bait holder 4 is preferably of annular form, internally arranged in the body 1, and provided with an annular groove or channel 6 and a central circular opening 7 through which the mouse passes into the chamber 3. The trough-like form of the bait holder 4 adapts it for holding a liquid bait, such as syrup, and when the mouse partakes of the bait, his feet become smeared with the syrup and hence rendered so slippery that it is then impossible for him to pass out through the opening 5 and he falls down through the opening 7 into the chamber 3. The trough-like bait holder is directly exposed to chamber 2 and can be seen by a mouse when at the mouth 5. The chamber 2 is unobstructed.

Preferably, the closure for the chamber 3 is in the form of a cup 9 having a bottom 8 and telescoping into the lower portion of the body 1, the latter resting upon the base 8 at 10. If it is desired to kill the mice, the cup 9 may be filled with water, or, this cup may be left empty and the mice will then be captured alive.

The trap stands in an upright position when in use, as shown in Fig. 1.

Having thus described my invention, what I claim as new and desire to secure by Letters Patent, is:—

1. An ever-set trap comprising a receptacle having an entrance, an entry chamber communicating therewith, an internal bait holder directly exposed to said entry chamber and provided with a passageway, and a catching chamber on the opposite side of the bait holder from said entry chamber, and a removable closure for the catching chamber.

2. An ever-set trap comprising a receptacle having an entrance, an entry chamber communicating therewith, an internal bait holder having a central passageway, and an annular channel surrounding said passageway, said channel facing and being directly exposed to the interior of the entry chamber, and a catching chamber on the opposite side of the bait holder from said entry chamber.

3. An ever-set trap comprising a receptacle having an entrance, an entry chamber communicating therewith, an internal bait holder directly exposed to said entry chamber and provided with a passageway, and a catching chamber on the opposite side of the bait holder from said entry chamber, said catching chamber having an open bottom, and a removable cup-shaped closure telescoping within the open end of the catching chamber and constituting a base and water holder therefor.

FRANCIS M. DRUM.

Witnesses:
 GEORGE EVANS,
 THEODORE LAVENDER.